(12) United States Patent
Sun et al.

(10) Patent No.: US 8,144,683 B1
(45) Date of Patent: Mar. 27, 2012

(54) HIGH THROUGHPUT FINE TIMING

(75) Inventors: Qinfang Sun, Santa Clara, CA (US);
Kai Shi, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 1117 days.

(21) Appl. No.: 11/947,746

(22) Filed: Nov. 29, 2007

(51) Int. Cl.
*H04J 3/24* (2006.01)

(52) U.S. Cl. ........ 370/349; 370/329; 370/338; 370/350; 370/389; 370/401; 370/516

(58) Field of Classification Search .......... 370/328, 370/329, 338, 349, 350, 400, 401
See application file for complete search history.

(56) References Cited

U.S. PATENT DOCUMENTS

| | | | |
|---|---|---|---|
| 6,158,041 A | 12/2000 | Raleigh et al. | |
| 6,353,637 B1 | 3/2002 | Mansour et al. | |
| 6,442,130 B1 | 8/2002 | Jones, IV et al. | |
| 2007/0058623 A1* | 3/2007 | Moorti et al. | 370/389 |
| 2007/0189263 A1* | 8/2007 | Izumi et al. | 370/350 |
| 2008/0086662 A1* | 4/2008 | Li et al. | 714/704 |

* cited by examiner

*Primary Examiner* — Christopher Grey
(74) *Attorney, Agent, or Firm* — Bever, Hoffman & Harms, LLP

(57) ABSTRACT

After detecting the predetermined phase rotation, a receiver can advantageously remove any cyclic shifting delays (CSDs) from the mixed mode packet for each chain. Once any CSDs are removed, the receiver can perform timing offset estimation and decode the mixed mode packet. In another embodiment, a timing offset from a channel for a first chain without any CSDs can be estimated. Compensation for the timing offset in the first chain can then be performed. At this point, the CSDs from other chains can then be removed. After CSD removal, compensation for any timing offsets in the other chains can be performed using the timing offset in the first chain.

17 Claims, 4 Drawing Sheets

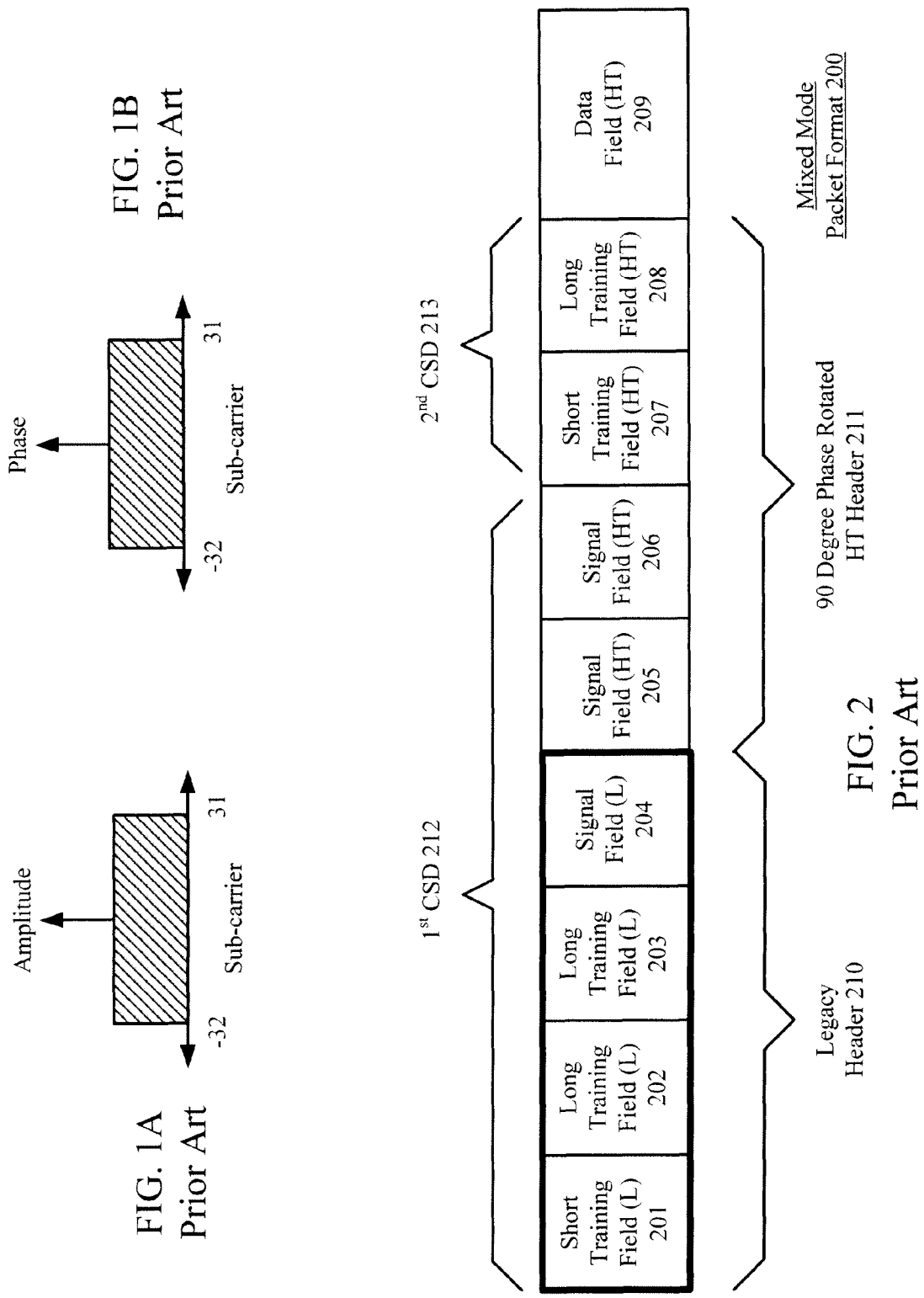

HIGH THROUGHPUT FINE TIMING

BACKGROUND OF THE INVENTION

1. Field of the Invention

The present invention relates to wireless networks, and in particular to quickly identifying mixed mode packets and accurately determining the receiver offset when receiving mixed mode packets.

2. Related Art

The IEEE 802.11-2007 is a set of standards relating to wireless local area networks (WLAN). The legacy standards, e.g. 802.11a and 802.11g, have data rates that are relatively low. For example, both 802.11a (released 1999) and 802.11g (released 2003) have a data rate of 54 Mbit/s. In contrast, one of the most recent standards, 802.11n (projected release 2008), has a data rate of 300 Mbit/s. Thus, 802.11n is characterized as a high throughput protocol. The 802.11n protocol achieves this high throughput by transmitting and receiving using multiple chains (multiple-input multiple-output (MIMO)).

An 802.11 access point (AP) can operate in one of three modes: the legacy, mixed, or Greenfield mode. In the legacy mode, the AP can use one of the legacy protocols, e.g. 802.11a or 802.11g. In the mixed mode, the AP can use one of the legacy protocols or 802.11n. In the Greenfield mode, the AP can only use 802.11n (wherein "Greenfield" refers to a project that lacks any constraint imposed by prior work).

In a legacy mode, the preamble of the packet can be used for both coarse and fine timing to correct for receiver offset. This legacy preamble consecutively includes a short training field, two long training fields, and a signal field. The short training field can be used to roughly estimate the boundary between the short training field and the first long training field. This rough estimate can be characterized as "coarse" timing. In contrast, the two long training fields in the legacy preamble can be consecutively used to provide better timing information. Therefore, the two long training fields can provide fine timing. Note that after a boundary between any two fields in the legacy preamble is accurately established, the beginning of the data field in the legacy packet can be ascertained.

In line-of-sight (LOS) channels or small delay spread channels, in the frequency domain, the amplitude of a signal can be assumed to be flat across the sub-carriers. For example, FIG. 1A illustrates an idealized amplitude that is flat across 64 sub-carriers for a 20 MHz signal (i.e. −32 to 31). Note that the idealized phase across these same sub-carriers should also optimally be flat, as illustrated in FIG. 1B.

If there is a timing offset, then the amplitude may still be flat, but the phase will experience a linear phase shift over the sub-carriers (also called tone dependency). The phase can be calculated using the following equation:

$$e^{\frac{-j2\Pi n_e k}{N}} \qquad \text{Equation 1}$$

where N is the total number of sub-carriers (e.g. 64), $n_e$ is the number of slots a sample is shifted (which can be negative or positive, typically in the range of 1-3), and k is specific sub-carrier (e.g. between −32 and 31). Thus, as evidenced by the variable k, the phase is sub-carrier dependent. Moreover, $n_e/N$ is the "slope" or the rate of phase change. Notably, the timing offset determines the slope and vice versa.

A mixed mode packet is introduced to support multiple chain transmission, where both a legacy header and a high throughput header are repeated on all chains. For example, FIG. 2 illustrates an exemplary mixed mode packet format 200 that includes a legacy header 210, a high throughput (HT) header 211, and an HT data field 209. Legacy header 210 includes a legacy short training field 201, first and second legacy long training fields 202 and 203, and a legacy signal field 204. HT header 211 includes first and second HT signal fields 205 and 206, an HT short training field 207, an HT long training field 208 (note that although only one field is shown in FIG. 2, multiple HT long training fields may be used for multiple streams).

To avoid unintentional beam-forming effects (which would otherwise prevent all receivers from hearing the preamble), different amounts of cyclic shift can be applied to the legacy header and the HT header transmitted from different chains. In a simple cyclic shift, samples from one chain are rotated by one sample in a wrap-around manner. For example, if one chain sequentially transmits samples 1-64, then a second chain sequentially transmits samples 64 and 2-63. Note that this cyclic shift can be independently applied to samples from each field.

In summary, a cyclic shift means that the same sample is transmitted at different times in the different chains. In one embodiment, the amount of cyclic shift can be measured by the time differential between the time the sample is originally designated to be transmitted and the time that sample is actually designated to be transmitted. The 802.11n standard specifies the cyclic shifting delay (CSD) for two, three, and four chains.

For example, the 802.11n standard specifies the cyclic shift amount for a first CSD 212 (which is applied to legacy header 210 and to HT signal fields 205/206 of HT header 211) to be 0 and −200 ns on chains 0 and 1 (two chains), and 0, −100 and −200 ns on chains 0, 1, and 2 (three chains). Additionally, the 802.11n standard specifies the cyclic shift amount for a second CSD 213 (which is applied to HT short training field 207 and HT long training field 208 of HT header 211) is 0 and −400 for chains 0 and 1 (two chains), and 0, −400, −200 on chains, 0, 1, and 2 (three chains). These cyclic shifts create artificial multipath in the channel as observed by the receiver.

Notably, this cyclic shifting poses significant challenges to accurately determining timing offset. Specifically, as described above for a legacy packet, any timing offset may be characterized as caused by the receiver. However, in the case of a mixed mode packet, samples are intentionally being delayed during transmit. Unfortunately, the receiver does not currently have the information necessary to determine if such intentional delays are being added at the transmitter. That is, the receiver does not know if a received packet is a mixed mode packet or a legacy packet. As a result, the conventional techniques used for estimating receiver offset when receiving a legacy packet cannot be used when receiving a mixed mode packet.

SUMMARY OF THE INVENTION

The IEEE 802.11n standard is a high throughput (HT) protocol that requires transmitting and receiving using multiple chains. The 802.11n packet, also called a mixed mode packet herein, includes both a legacy header and an HT header. Notably, 802.11n requires that different amounts of cyclic shift be applied to the legacy/HT headers transmitted from different chains. This cyclic shifting poses significant challenges to accurately determining the timing offset of the receiver.

That is, as noted above in the case of a mixed mode packet, samples are intentionally being delayed during transmit.

However, a receiver currently lacks the information necessary to determine if intentional delays are being added at the transmitter. In short, the receiver does not know if a received packet is a mixed mode packet or a legacy packet. As a result, conventional techniques used for estimating timing offset cannot be used when a mixed mode packet is received.

In accordance with 802.11n, a transmitter can apply a predetermined phase rotation (e.g. 90 degrees) to the HT header relative to the legacy header for each chain. This predetermined phase rotation allows a receiver to easily distinguish between a legacy packet and a mixed mode (i.e. an IEEE 802.11n) packet. Also in accordance with 802.11n, the transmitter can apply multiple cyclic shifting delays (CSDs) to the mixed mode packet for each chain. For example, the transmitter can apply a first CSD to the legacy header, a first HT signal field, and a second HT signal field, and a second CSD to an HT short training field and an HT long training field, wherein the delay associated with each CSD may vary from chain to chain.

Notably, after detecting the predetermined phase rotation to the HT header, a receiver can advantageously remove any CSDs from the plurality of fields of the mixed mode packet for each chain. For example, the receiver can remove the first CSD from the legacy header, the first HT signal field, and the second HT signal field, as well as remove the second CSD from the HT short training field and the HT long training field. After the CSDs are removed, the receiver can perform accurate timing offset estimation.

In another embodiment, after detecting the predetermined phase rotation to the HT header, the receiver can estimate the timing offset for chain 0, which includes no CSD, and then compensate for such timing offset. At this point, the CSDs for any other chains (i.e. chain 1 or chains 1 and 2) can be removed, thereby allowing the receiver to compensate for the timing offsets in such chains using the timing offset associated with chain 0. As indicated above, CSDs are not included in the HT data field.

BRIEF DESCRIPTION OF THE FIGURES

FIGS. 1A and 1B illustrate that idealized amplitudes and phases for legacy packets are flat across sub-carriers in the frequency domain.

FIG. 2 illustrates a conventional mixed mode packet format. This mixed mode packet format can also include two cyclic shifting delays applied to the legacy and HT headers. In this known mixed mode packet format, a 90 degree rotation is applied to the high throughput (HT) header at the transmitter, thereby allowing the receiver to easily distinguish this packet from a legacy packet.

DETAILED DESCRIPTION OF THE FIGURES

To facilitate distinguishing a mixed mode packet from a legacy packet in accordance with 802.11n, a predetermined (e.g. 90 degree) phase rotation can be added to the high throughput (HT) header in a mixed mode packet. Specifically, in accordance with 802.11n, HT header 211 (FIG. 2) can be phase rotated 90 degrees with respect to legacy header 310. This intentional phase rotation (added at the transmitter) allows a receiver to easily distinguish this packet from a legacy packet.

Figure 3:
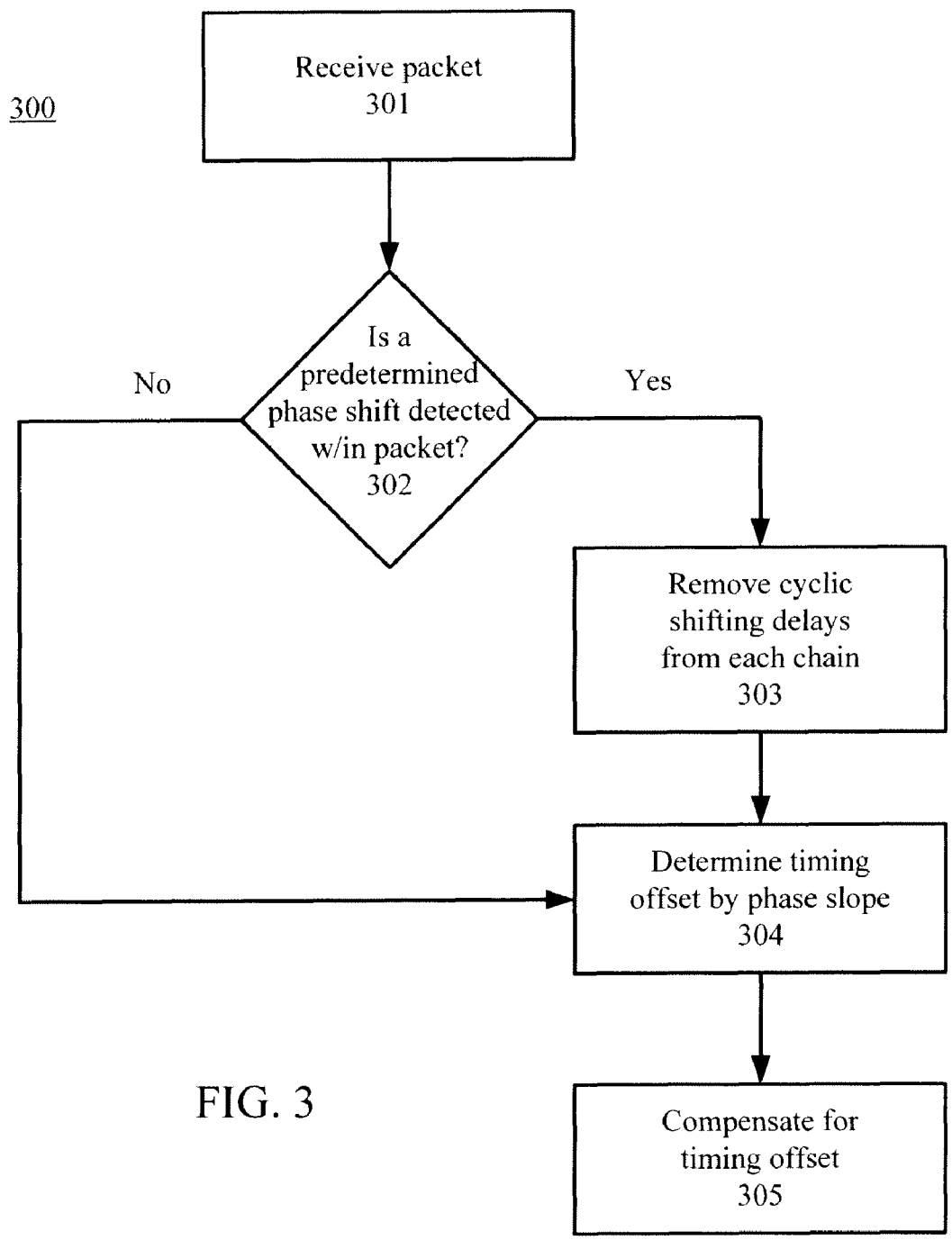
FIG. 3 illustrates a technique for receiving a packet in a mixed mode system and determining a receiver offset.

Notably, after a mixed mode packet is identified, the effects of cyclic shifting can be taken into account (i.e. removed), thereby allowing any offset caused by the receiver to be accurately determined. For example, FIG. 3 illustrates a technique 300 for fine timing when a receiver may receive a legacy packet or a mixed mode packet. In step 301, the receiver receives a packet that may be a legacy packet or a mixed mode packet. In step 302, the receiver determines whether a predetermined phase shift (e.g. 90 degrees) within the received packet is detected.

If the predetermined phase shift is detected, which identifies the packet as a mixed mode packet, then step 303 removes the cyclic shifting delays (CSDs) from each chain. As noted herein, the CSDs are known, as promulgated by 802.11n. Thus, these CSDs can be stored in the receiver, accessed, and then removed from the received packet for each chain. Note that the HT signal fields can provide the number of transmit streams. In one embodiment, the number of chains (which can affect accurate CSD removal) is assumed to be the same as the number of transmit streams.

At this point, step 304 can determine the timing offset caused by the receiver, wherein the timing offset can be derived from the phase slope. Step 305 can compensate for the timing offset, thereby facilitating accurate decoding of the mixed mode packet. Steps 303-305 are described in further detail in reference to FIG. 4. Note that if the predetermined phase shift is not detected in the packet, which identifies the packet as a legacy packet, then technique 300 can proceed directly from step 302 to step 304 of determining the timing offset.

Notably, after detection of the predetermined phase shift (i.e. between legacy signal field 204 and HT signal field 205), the receiver can remove the timing offset relating to first CSD 212 from HT signal fields 205 and 206, thereby allowing the accurate decoding of those signal fields. Thus, the legacy header can be effectively ignored by the receiver. Additionally, the receiver can remove the timing offset relating to second CSD 213 from HT short training field 207 and HT long training field 208. After second CSD 213 is removed, then the receiver can perform a coarse timing estimation using HT short training field 207 and a fine timing estimation using HT long training field 208. Note that the timing estimation for each field can be performed at any time after the CSD for that field has been removed.

Thus, in essence, the detection of the predetermined phase shift can be done for the limited purpose of performing a first ultra-coarse timing estimation. That is, the durations of HT signal fields 205 and 206 are known. Therefore, when the pre-determined phase shift is detected, the beginning of HT short training field 207 can be very roughly estimated.

Figure 4:
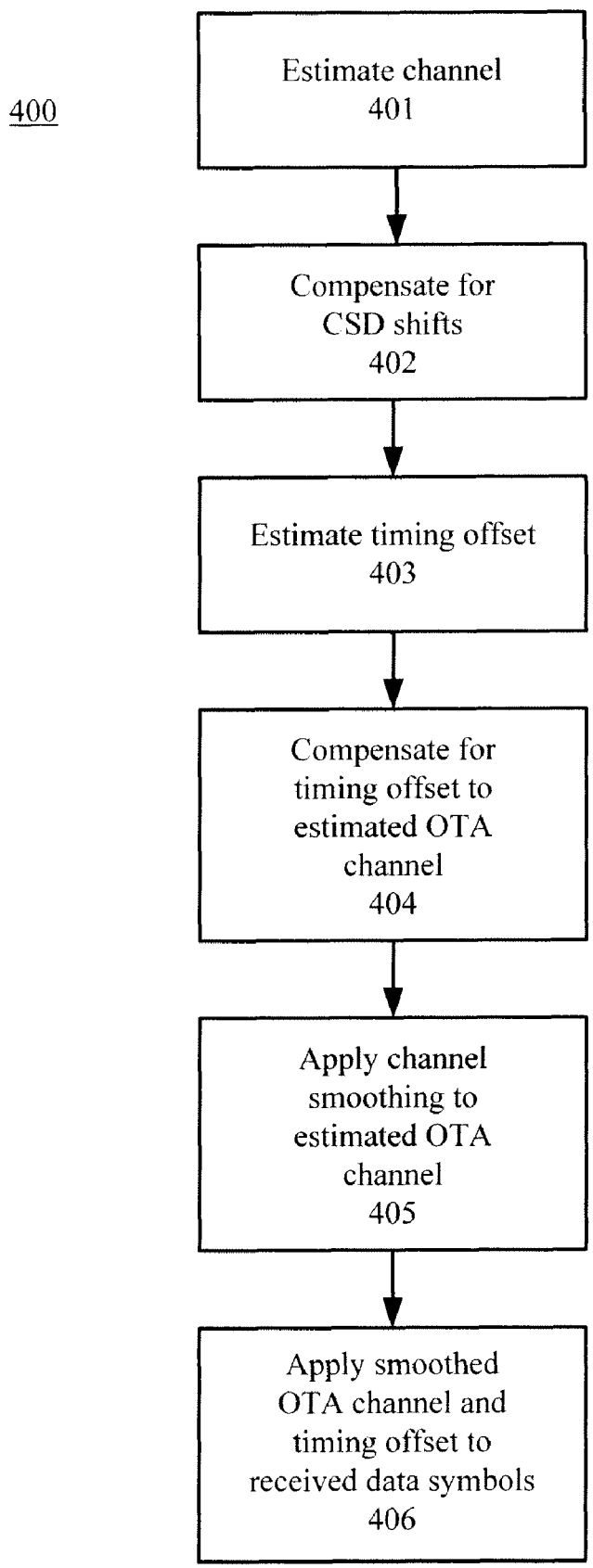
FIG. 4 illustrates more detailed exemplary steps associated with steps 303-305 of FIG. 3.

FIG. 4 illustrates an exemplary technique 400 for recovering an 802.11n data stream $s_d$ from a receive data tone $r_d$. The receive data tone $r_d$ can be defined by the following equation.

$$r_d(k) = H_{OTA}(k) Q_{CSD} s_d \exp\left(-j2\pi\tau\frac{k}{N}\right) + n(k) \quad \text{Equation 1}$$

wherein $H_{OTA}$ is the "over the air" (OTA) channel, $Q_{CSD}$ is the matrix describing CSD, $s_d$ is the matrix describing the sent streams, $$\exp\left(-j2\pi\tau\frac{k}{N}\right)$$

is the phase rotation caused by timing offset τ, and n is the noise. Notably, the $Q_{CSD}$ matrix describes the cyclic shift and can be determined by data in the HT-SIG field.

Estimating the timing offset r and the OTA channel $H_{OTA}$ (k), can be done based on a training sequence matrix $S_t$ (wherein $S_t$ is a known sequence). Specifically, the received training sequence (similar to Equation 1) can be defined by the following equation.

$$R_t(k) = H_{OTA}(k)Q_{CSD}S_t\exp\left(-j2\pi\tau\frac{k}{N}\right) + w(k) \quad \text{Equation 2}$$

wherein $R_1(k)$ is the received signal matrix for the training sequence and w(k) is noise.

In step 401, which assumes de minimus noise for simplicity, the channel may be estimated by the following equivalent equations.

$$\hat{H}(k) = R_t(k)S_t^{-1} = H_{OTA}(k)Q_{CSD}\exp\left(-j2\pi\tau\frac{k}{N}\right) \quad \text{Equations 3}$$

In step 402, once again assuming de minimus noise, the CSD shifts may be compensated for by using the following equivalent equations.

$$\hat{H}1_{OTA}(k) = \hat{H}(k)Q_{CSD}^{-1} = H_{OTA}(k)\exp\left(-j2\pi\tau\frac{k}{N}\right) \quad \text{Equations 4}$$

wherein $\hat{H}1_{OTA}$ is a preliminary estimated OTA channel. Thus, steps 401 and 402 can implement the function described in reference to step 303 (FIG. 3).

In step 403, the timing offset r can be estimated based on the estimated OTA channel (i.e. using the phase slope) by using the following equation.

$$\hat{\tau} = \frac{1}{2\pi}\arctan\left\{\sum_{k=0}^{N-2}\hat{H}1_{OTA}(k)\hat{H}_{OTA}^*(k-1)\right\} \quad \text{Equation 5}$$

Thus, step 403 can implement the function described in reference to step 304 (FIG. 3).

In step 404, the timing offset to the estimated OTA channel $\hat{H}1_{OTA}(k)$ can be compensated for by using the following equation.

$$\hat{H}_{OTA}(k) = \hat{H}1_{OTA}(k) * \exp\left(j2\pi\hat{\tau}\frac{k}{N}\right) \quad \text{Equation 6}$$

In step 405, channel smoothing can be applied to $\hat{H}_{OTA}(k)$ by FIR filtering across the frequency bins.

In step 406, the smoothed estimated OTA channel $\hat{H}_{OTA}(k)$ and the timing offset τ can be applied to the received data symbols. Thus, steps 404, 405, and 406 can implement the function described in reference to step 305 (FIG. 3).

Note that in the case of multiple transmitters and multiple receivers, each channel between a transmitter and a receiver can be smoothed individually by providing narrowband filtering across the tones received by that receiver from that transmitter. In one embodiment, the type of channel smoothing used for legacy packets can be applied to HT packets. U.S. patent application Ser. No. 09/816,810, filed on Mar. 23, 2001 by Atheros Communications, Inc. and entitled "Decoding System And Method For Digital Communications", which is incorporated by reference herein, describes such an exemplary channel smoothing technique.

Figure 5:
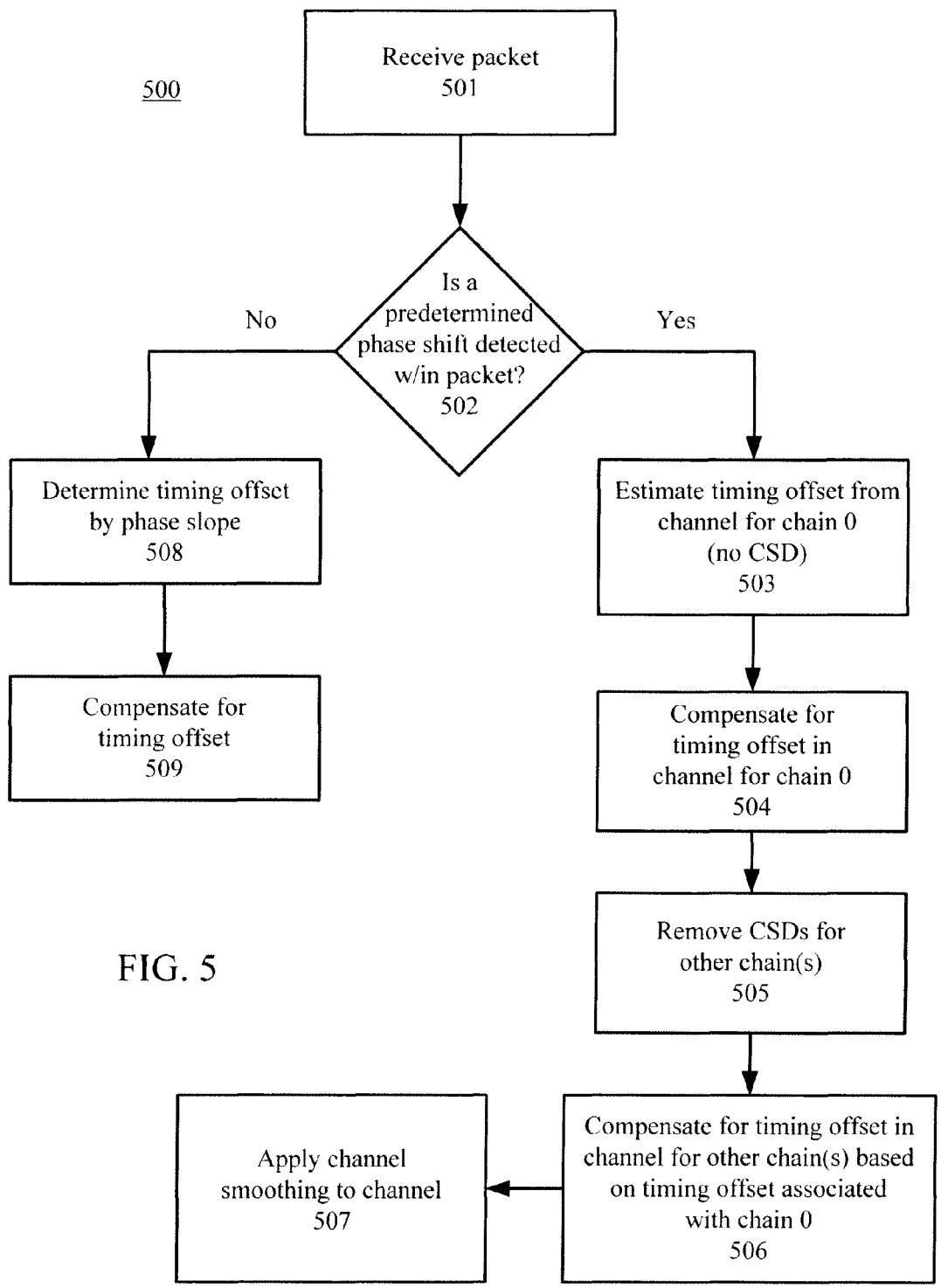
FIG. 5 illustrates another technique for receiving a packet in a mixed mode system and determining a receiver offset.

FIG. 5 illustrates another technique 500 for fine timing when a receiver may receive a legacy packet or a mixed mode packet. In step 501, the receiver receives a packet that may be a legacy packet or a mixed mode packet. In step 502, the receiver determines whether a predetermined phase shift (e.g. 90 degrees) within the received packet is detected.

If the predetermined phase shift is detected, which identifies the packet as a mixed mode packet, then step 503 estimates the timing offset from the channel for chain 0, which has no CSD. Step 504 can then compensate for such timing offset in chain 0. At this point, step 505 can remove the CSDs from the other chain(s)(e.g. chain 1 or chains 1 and 2) and step 506 can compensate for the timing offset in those chains using the timing offset determined in step 503. Step 507 can apply channel smoothing to the channel (e.g. as described in reference to step 405, FIG. 4).

Note that if the predetermined phase shift is not detected in the packet, which identifies the packet as a legacy packet, then technique 500 can determine the timing offset by phase slope (step 508) and compensate for such timing offset accordingly (step 509). As indicated above, CSDs are not included in the HT data field.

Note that the above-described techniques performed by a receiver (i.e. detecting the predetermined phase shift as well as removing the first and second CSDs) can be implemented in digital electrical circuitry, or in computer hardware, firmware, software, or in combinations of them. Generically, any such implementation can be characterized as "logic" for performing the steps relating to phase rotation and CSDs.

With regards to a software implementation, one or more computer programs can execute on a programmable system including at least one programmable processor coupled to receive data and instructions from, and to transmit data and instructions to, a data storage system, at least one input device, and at least one output device. Programmable processors include, by way of example, general microprocessor, special purpose microprocessors, or other types of microcontrollers. A processor can receive instructions and data from a read-only memory and/or a random access memory. Generally, a computer will include one or more mass storage devices for storing data files. Such mass storage devices may include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Although illustrative embodiments have been described in detail herein with reference to the accompanying figures, it is to be understood that the invention is not limited to those precise embodiment. They are not intended to be exhaustive or to limit the invention to the precise forms disclosed. As such, many modifications and variations will be apparent to practitioners skilled in this art.

For example, in one embodiment, to perform the coarse and fine timing using short training field 307 and long training field 308 (FIG. 3), only a portion of the symbols in those fields may be used. In one embodiment, approximately half of the symbols are used, e.g. the first half of the symbols. Using only a portion of the symbols to perform the timing estimations, although at the expense of some accuracy, can advantageously minimize delays in packet decoding.

As another example, the Green Field (GF) HT packets do not have a legacy portion, therefore channel estimation can be done in two stages. A first channel estimation can be done using a first HT long training field, thereby allowing decoding of the HT signal fields. A second (and more accurate) channel estimation (including fine timing and channel smoothing in FIG. 4) can be done using all the HT long training fields, thereby allowing decoding of the data field.

Accordingly, it is intended that the scope of the invention be defined by the following claims and their equivalents.

The invention claimed is:

1. A method of receiving a mixed mode packet, the mixed mode packet including a legacy header and a high throughput (HT) header, the method comprising:
   receiving a packet;
   determining whether a predetermined phase rotation in the packet is detected;
   after detecting the predetermined phase rotation, which identifies the packet as a mixed mode packet, removing at least one cyclic shifting delay (CSD) from a plurality of fields of the mixed mode packet from each chain, wherein removing includes computing an "over the air" (OTA) channel value;
   after CSD removal, determining a timing offset of the mixed mode packet based on the OTA channel value; and
   after determining the timing offset, compensating for the timing offset, thereby facilitating accurate decoding of the mixed mode packet,
   wherein computing the OTA channel value includes:
   computing a preliminary estimated "over the air" (OTA) channel $\hat{H}1_{OTA}(k)$ using a first equation:

$$\hat{H}1_{OTA}(k) = \hat{H}(k)Q_{CSD}^{-1} = H_{OTA}(k)\exp\left(j2\pi\tau\frac{k}{N}\right),$$

wherein $\hat{H}$ is an estimated channel, $Q_{CSD}$ is a matrix describing CSD, $H_{OTA}$ is an OTA channel, $$\exp\left(j2\pi\tau\frac{k}{N}\right)$$

is a timing error, and $\tau$ is a timing offset.

2. The method of claim 1, wherein the predetermined phase rotation is 90 degrees.

3. The method of claim 1, wherein the HT header includes a first HT signal field, a second HT signal field, an HT short training field, and at least one HT long training field.

4. The method of claim 3, wherein removing at least one CSD from the plurality of fields of the mixed mode packet for each chain includes:
   removing a first CSD from the legacy header, the first HT signal field, and the second HT signal field; and
   removing a second CSD to the HT short training field and the HT long training field.

5. The method of claim 1, wherein determining the timing offset includes:
   generating an estimated timing offset $\hat{\tau}$ based on the estimated OTA channel $\hat{H}1_{OTA}(k)$ by using a second equation:

$$\hat{\tau} = \frac{N}{2\pi}\arctan\left\{\sum_{k=0}^{N-2}\hat{H}1_{OTA}(k)\hat{H}_{OTA}^{*}(k-1)\right\}.$$

6. The method of claim 5, wherein compensating for the timing offset includes:
   compensating for the estimated timing offset by using a third equation:

$$\hat{H}_{OTA}(k) = \hat{H}1_{OTA}(k)*\exp\left(-j2\pi\hat{\tau}\frac{k}{N}\right).$$

7. The method of claim 6, wherein compensating for the timing offset further includes:
   applying channel smoothing to the estimated OTA channel $\hat{H}_{OTA}(k)$ by FIR filtering across frequency bins.

8. A non-transitory, computer-readable medium storing executable instructions, the computer-readable medium used in a receiver for receiving a mixed mode packet, the mixed mode packet including a legacy header and a high throughput (HT) header, the instructions when executed by a processor performing steps comprising:
   receiving a packet;
   determining whether a predetermined phase rotation in the packet is detected, the predetermined phase rotation identifying the packet as a mixed mode packet;
   removing at least one cyclic shifting delay (CSD) from a plurality of fields of the mixed mode packet from each chain after detecting the predetermined phase rotation, wherein removing includes computing an "over the air" (OTA) channel value;
   determining a timing offset of the mixed mode packet based on the OTA channel value after CSD removal; and
   compensating for the timing offset after determining the timing offset,
   wherein computing includes:
   computing a preliminary estimated "over the air" (OTA) channel $\hat{H}1_{OTA}(k)$ using a first equation set:

$$\hat{H}1_{OTA}(k) = \hat{H}(k)Q_{CSD}^{-1} = H_{OTA}(k)\exp\left(j2\pi\tau\frac{k}{N}\right),$$

wherein $\hat{H}$ is an estimated channel, $Q_{CSD}$ is a matrix describing CSD, $H_{OTA}$ is an OTA channel, $$\exp\left(j2\pi\tau\frac{k}{N}\right)$$

is a timing error, and $\tau$ is a timing offset.

9. The receiver computer-readable medium of claim 8, wherein the predetermined phase rotation is 90 degrees.

10. The receiver computer-readable medium of claim 8, wherein the HT header includes a first HT signal field, a second HT signal field, an HT short training field, and at least one HT long training field.

11. The receiver computer-readable medium of claim 10, wherein the removing at least one CSD from the plurality of fields of the mixed mode packet for each chain includes:
removing a first CSD from the legacy header, the first HT signal field, and the second HT signal field; and
removing a second CSD from the HT short training field and the HT long training field.

12. The computer-readable medium of claim 8, wherein the determining the timing offset includes:
generating an estimated timing offset $\hat{\tau}$ based on the estimated OTA channel $\hat{H}1_{OTA}(k)$ by using a second equation:

$$\hat{\tau} = \frac{N}{2\pi} \arctan\left\{ \sum_{k=0}^{N-2} \hat{H}1_{OTA}(k)\hat{H}^*_{OTA}(k-1) \right\}.$$

13. The computer-readable medium of claim 12, wherein the compensating for the timing offset includes:
compensating for the estimated timing offset by using a third equation:

$$\hat{H}_{OTA}(k) = \hat{H}1_{OTA}(k) * \exp\left(-j2\pi\hat{\tau}\frac{k}{N}\right).$$

14. The computer-readable medium of claim 13, wherein the compensating for the timing offset further includes:
applying channel smoothing to the estimated OTA channel $\hat{H}_{OTA}(k)$ by FIR filtering across frequency bins.

15. A method of receiving a mixed mode packet, the mixed mode packet including a legacy header and a high throughput (HT) header, the method comprising:
receiving a packet;
determining whether a predetermined phase rotation in the packet is detected;
after detecting the predetermined phase rotation, which identifies the packet as a mixed mode packet, estimating a timing offset from a channel for a first chain without cyclic shifting delay (CSD) by computing an "over the air" (OTA) channel value;
compensating for the timing offset in the first chain based on the OTA channel value;
removing CSDs from other chains; and
after CSD removal, compensating for any timing offsets in the other chains using the timing offset in the first chain.

16. The method of claim 15, further including applying channel smoothing to the channel.

17. A receiver for receiving a mixed mode packet, the receiver including a non-transitory computer-readable storage device storing instructions that when executed by a computer perform steps comprising:
receiving a packet;
determining whether a predetermined phase rotation in the packet is detected;
using the computer, estimating a timing offset from a channel for a first chain without cyclic shifting delay (CSD) by computing an "over the air" (OTA) channel value after detecting the predetermined phase rotation;
compensating for the timing offset in the first chain based on the OTA channel value;
removing CSDs from other chains; and
compensating for any timing offsets in the other chains using the timing offset in the first chain after CSD removal.

* * * * *